Patented Nov. 15, 1932

1,887,816

UNITED STATES PATENT OFFICE

RICHARD THOMPSON MAUDSLEY, OF QUINTON, BIRMINGHAM, ENGLAND

SULPHURIC ACID CHAMBER

Application filed July 25, 1930, Serial No. 470,743, and in Great Britain March 28, 1930.

This invention relates to improvements in sulphuric acid chambers and has for its object to provide a relatively simple and compact construction of sulphuric acid chamber which offers a very large cooling surface in relation to the space occupied.

According to my invention a sulphuric acid chamber is in cross-section a segment of a circle or other curvilinear closed figure and is adapted and intended to be associated with another chamber of complementary shape in a juxtaposition permitting external water cooling of adjacent surfaces.

The invention will be best understood from the following description of a preferred embodiment illustrated in the accompanying drawings.

Referring to the drawings:—

Figure 1:
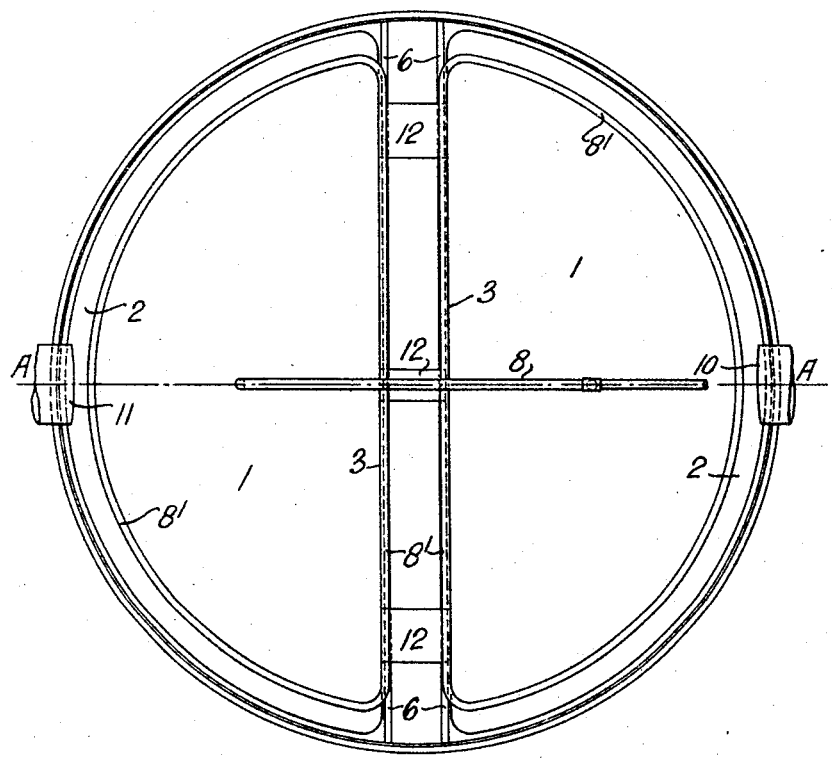
Figure 1 is a plan view of one form of apparatus constructed in accordance with the invention.
Figure 2:
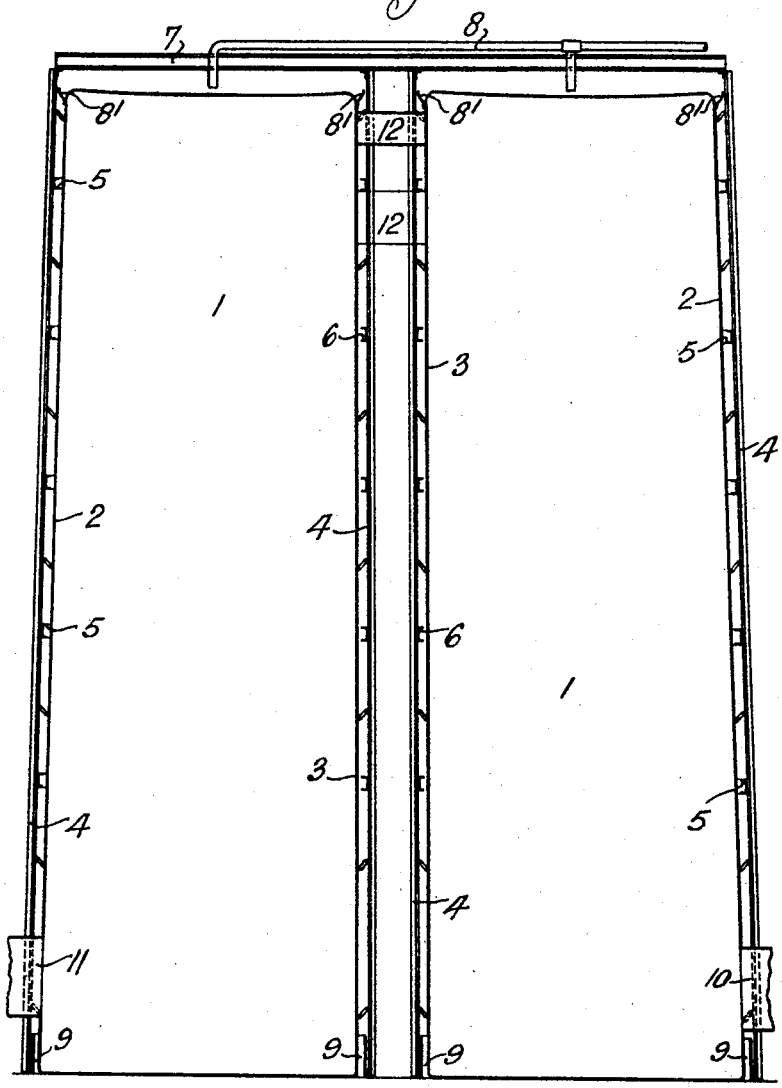
Figure 2 is a sectional elevation of the apparatus shown in Figure 1 (certain parts being omitted for clearness) through the line A—A.

A complementary pair of chambers is represented by 1, 1 each being in plan view in the form of a segment of a circle bounded by a circular wall 2 and a flat side 3, the flat sides being adjacent. The circular walls 2 are arranged to slope outwardly towards the bottom at a slight angle from the vertical. The adjacent flat sides 3 may be vertical or may be arranged to slope outwardly in a similar manner to the circular walls, each chamber being in the form of a half frustum of a cone.

The chambers are supported by a steel frame work comprising upright T-section members 4 connected by channel iron rings 5. Transverse supporting members 6 are also provided adjacent the flat sides of the chambers. Upright members 4 are braced transversely by means of members 7.

The chambers which may be constructed of lead or any other material of an acid resisting nature or rendered acid resisting by surface treatment such as coating or impregnation, are suspended from links pivotally attached to the upright members 4 in the manner described in Letters Patent of the United States No. 1,627,043.

Water for cooling purposes is fed by means of a pipe 8 to the centre of the top or ceiling of each chamber (the ceiling being slightly dished) and the water flows from the ceiling into a serrated gutter 8' surrounding the top of each chamber, whence it trickles down the walls of the chamber to a trough 9 round the base of each chamber.

The gases will in general flow in series through the complementary chambers, an inlet 10 being provided at or near the bottom of one chamber and an outlet 11 at the bottom of the next adjacent chamber, the chambers being interconnected by one or more connecting pipes 12. Suitable means are provided for spraying acid or water or water vapour into the chambers.

Various modifications may be made in the apparatus as described above without departing from the scope of the invention. For example the circular walls may be made vertical, the chambers being in the form of a section of a cylinder.

What I claim is:—

1. In combination a pair of sulphuric acid chambers each forming substantially half of a cylinder, said chambers being complementally suspended from a common supporting framework and having their adjacent straight sides sufficiently spaced apart to accommodate said supporting framework, water cooling means being provided for cooling the whole external surface of each of said chambers.

2. In combination a pair of sulphuric acid chambers each forming substantially half of a frustum of a cone, said chambers being complementally suspended from a common supporting framework and having their adjacent straight sides sufficiently spaced apart to accommodate said supporting framework, water cooling means being provided for cooling the whole external surface of each of said chambers.

3. In combination a pair of sulphuric acid chambers each forming substantially half of a cylinder, said chambers being complementally located with their adjacent sides parallel, a supporting framework for said chambers and water cooling means comprising a serrated gutter surrounding each of said chambers near the top thereof, and a trough surrounding each chamber at the base thereof, and means for conveying cooling water to the top of each of said chambers.

4. In combination a pair of sulphuric acid chambers each forming substantially half of a frustum of a cone, said chambers being complementally located with their adjacent sides parallel, a supporting framework for said chambers and water cooling means comprising a serrated gutter surrounding each of said chambers near the top thereof, and a trough surrounding each chamber at the base thereof, and means for conveying cooling water to the top of each of said chambers.

5. A sulphuric acid chamber constructed in two parts and which in cross-section is a pair of segments of a figure of substantially regular contour, the cords of the segments being opposite to each other and spaced apart, thus leaving a gap between opposing surfaces of each part of the chamber, a supporting framework for the said parts disposed in said gap, and means for water-cooling the opposing surfaces as well as the curved external surface of each part.

6. A sulphuric acid chamber constructed in two parts, which in cross section is substantially a pair of semicircles with the diameters opposite and parallel to each other and spaced apart, thus leaving a gap between opposing surfaces of each part of the chamber, a supporting framework for the said parts disposed in said gap, and means for water-cooling the opposing surfaces as well as the curved external surface of each part.

7. A duplex sulphuric acid chamber comprising chamber members closed at the top and having substantially flat and upstanding external wall portions opposing each other and separated by a relatively narrow gap, the remainder of the upstanding external walls inclining downwardly and outwardly, supporting framework for the members accommodated in the gap, and means for water-cooling the said external walls.

8. A duplex sulphuric acid chamber comprising chamber members having substantially parallel external walls opposing each other and separated by a relatively narrow gap, supporting framework for the members accommodated in said gap, and means for water-cooling said walls and the remaining external surfaces of the members.

In testimony that I claim the foregoing as my invention I have signed my name this 11th day of July, 1930.

RICHARD THOMPSON MAUDSLEY.